(12) United States Patent
Askinasi

(10) Patent No.: US 8,113,146 B2
(45) Date of Patent: Feb. 14, 2012

(54) ANIMAL WASTE PAD HOLDER

(75) Inventor: Barry Askinasi, Mt. Sinai, NY (US)

(73) Assignee: Four Paws Products, Ltd., Hauppauge, NY (US)

(*) Notice: Subject to any disclaimer, the term of this patent is extended or adjusted under 35 U.S.C. 154(b) by 108 days.

(21) Appl. No.: 12/473,119

(22) Filed: May 27, 2009

(65) Prior Publication Data

US 2010/0300367 A1    Dec. 2, 2010

(51) Int. Cl.
*A01K 1/035* (2006.01)

(52) U.S. Cl. ............ 119/169; 119/165; 119/469

(58) Field of Classification Search .......... 119/165, 119/167, 169, 170, 458, 479, 525, 529, 28.5
See application file for complete search history.

(56) References Cited

U.S. PATENT DOCUMENTS

| | | | | |
|---|---|---|---|---|
| 3,827,401 A | * | 8/1974 | Franzl | 119/169 |
| 5,184,574 A | * | 2/1993 | Kirk et al. | 119/162 |
| 5,353,743 A | * | 10/1994 | Walton | 119/166 |
| D408,599 S | * | 4/1999 | Vice et al. | D30/161 |
| 5,893,336 A | * | 4/1999 | Vice et al. | 119/166 |
| 5,988,112 A | * | 11/1999 | Pisa | 119/479 |
| 6,332,429 B1 | * | 12/2001 | Gramlich | 119/165 |
| 7,051,678 B2 | * | 5/2006 | Strickland et al. | 119/165 |
| 7,481,182 B2 | * | 1/2009 | Simpson et al. | 119/168 |
| 7,610,877 B2 | * | 11/2009 | Garfield | 119/170 |
| D613,914 S | * | 4/2010 | Askinasi | D30/161 |
| D621,105 S | * | 8/2010 | Askinasi | D30/161 |
| 2001/0025910 A1 | | 10/2001 | Olivadoti | |
| 2006/0102084 A1 | * | 5/2006 | Garfield | 119/165 |
| 2007/0084413 A1 | * | 4/2007 | Oertel et al. | 119/165 |
| 2007/0113793 A1 | * | 5/2007 | Kurahashi et al. | 119/479 |
| 2008/0060585 A1 | * | 3/2008 | Garfield | 119/165 |
| 2008/0178818 A1 | * | 7/2008 | Aley | 119/165 |
| 2008/0251026 A1 | * | 10/2008 | Bell et al. | 119/168 |
| 2009/0126643 A1 | * | 5/2009 | Fountain et al. | 119/165 |
| 2010/0043717 A1 | * | 2/2010 | Walker | 119/167 |
| 2010/0224133 A1 | * | 9/2010 | Hiroshima et al. | 119/169 |
| 2010/0275853 A1 | * | 11/2010 | Petersen | 119/165 |

FOREIGN PATENT DOCUMENTS

WO    WO2010/003794    1/2010

OTHER PUBLICATIONS

Great Britain Application No. GB1008641.1; Great Britain Search Report dated Sep. 23, 2010.

* cited by examiner

*Primary Examiner* — Rob Swiatek
*Assistant Examiner* — Lisa Tsang
(74) *Attorney, Agent, or Firm* — Grossman, Tucker, Perreault & Pfleger, PLLC

(57) ABSTRACT

A device for holding animal waste pads having raised peripheral sidewalls surrounding a base for containing a waste pad, and sidewall extensions attachable to the sidewalls to contain and direct an animal to an appropriate position in the use of the animal waste pads.

9 Claims, 6 Drawing Sheets

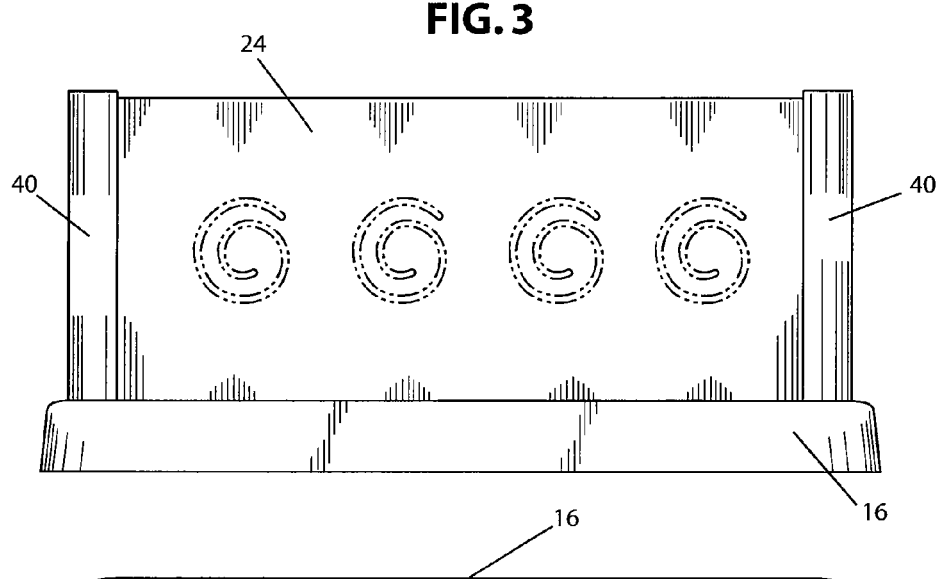
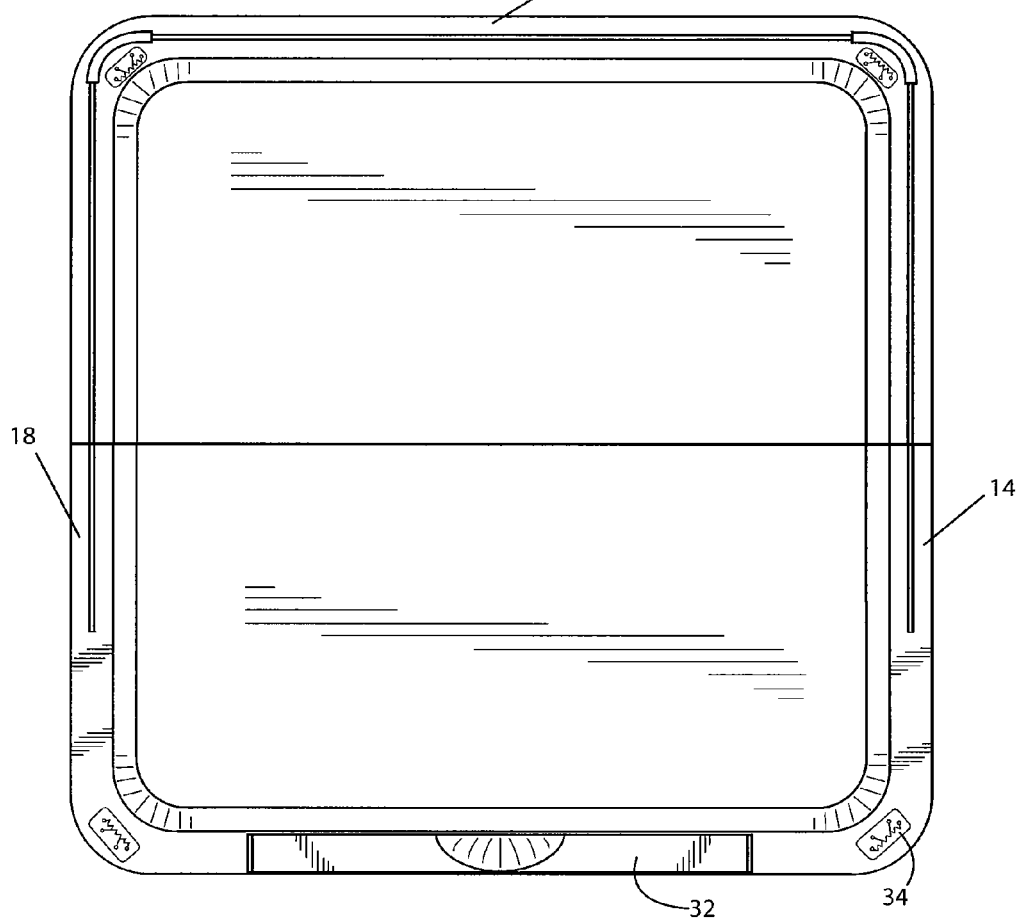

ANIMAL WASTE PAD HOLDER

FIELD OF THE INVENTION

The present invention generally relates to a device that holds disposable animal waste pads, and more specifically to a device that holds the animal waste pad and is configured to increase the likelihood that an animal will properly use the waste pad.

BACKGROUND OF THE INVENTION

House training of pets, and in particular dogs, is often necessary so that the animal may relieve itself when the pet owners are away or unavailable to let the animal outside. A waste pad provides an area for a dog or other animal to relieve itself without damaging flooring and to make cleanup of the area easier because they absorb liquid waste and are, in general, disposable.

The waste pads are often left on the floor for the pet to use. Providing the pads in a predetermined area provides consistency to the animal using the pad and helps to reinforce the use of the pad in a specified area. However, pads by themselves can be easily moved across the floor either by the pet owner kicking or stepping on the pad or when the animal uses the pad. A dog may chew, gnaw, drag, fold, cause the pad to bunch up, or otherwise damage or destroy the pad. Also, it can be difficult for the pet owner to place the pad consistently in the predetermined location for the animal. In addition, just using a pad on the floor leads to a likelihood that the animal will not stand in the correct location for the optimal use of the pad.

Therefore, it would be advantageous to have a device that holds a pad for use by the animal and provides features that direct the animal to the optimal use of the pad.

BRIEF DESCRIPTION OF THE DRAWINGS

The foregoing and other features of the present invention will be more readily apparent from the following detailed description and drawings of illustrative embodiments of the invention in which:

FIG. 3 is a back view of the waste pad holder in accordance with one embodiment of the invention;

FIG. 4 is a top view of the waste pad holder in accordance with one embodiment of the invention;

DETAILED DESCRIPTION OF THE PREFERRED EMBODIMENTS

Figure 1:
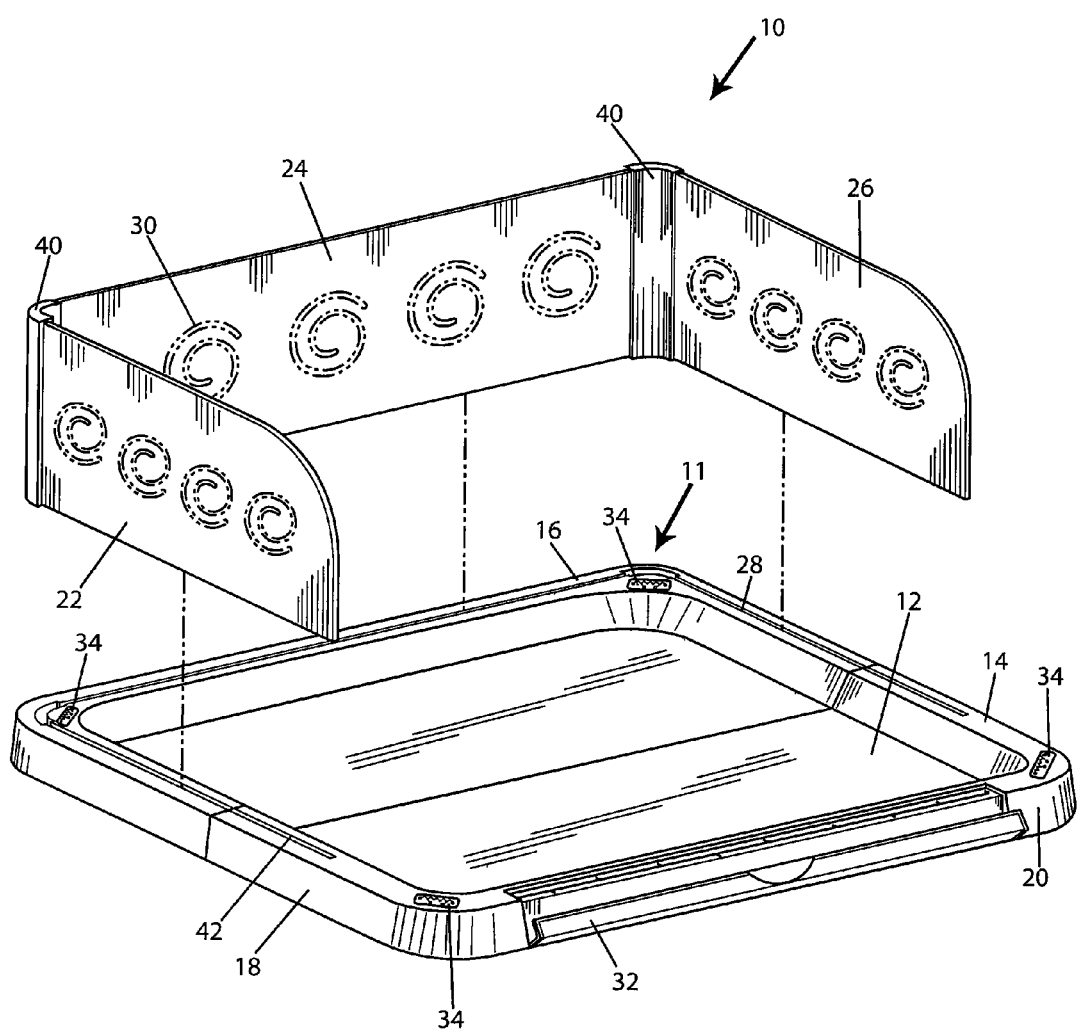
FIG. 1 is a perspective view of the waste pad holder in accordance with one embodiment of the invention.
Figure 2:
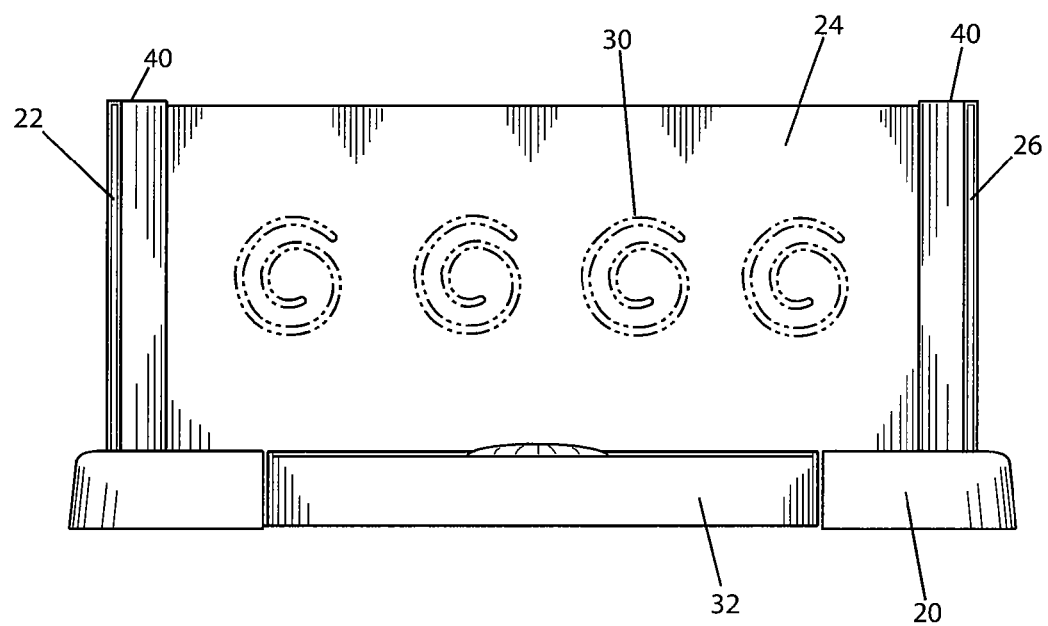
FIG. 2 is a front view of the waste pad holder in accordance with one embodiment of the invention.

Various embodiments now will be described more fully hereinafter with reference to the accompanying drawings, which form a part hereof, and which show, by way of illustration, specific embodiments. However, this invention may be embodied in many different forms and should not be construed as limited to the embodiments set forth herein. Rather, these embodiments are provided so that this disclosure will be thorough and complete, and will fully convey the scope of the invention to those skilled in the art. The following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Waste pad holder 10 is shown in FIGS. 1 to 4. Waste pad holder 10 contains base 11 that is comprised of bottom 12 and sidewalls 14, 16, 18 and 20. Bottom 12 is substantially planar and configured to hold a waste pad. In one embodiment, bottom 12 is substantially flat and has a surface area on its top that is substantially the same as a waste pad. In another embodiment, bottom 12 has a slightly concave curvature so that animal waste that is not readily absorbed by the waste pad will pool toward the center of the holder rather than towards the edges.

Sidewalls 14, 16, 18 and 20 are attached to the peripheral edges of base 12. The sidewalls are perpendicular to and extend upward from bottom 12. In one embodiment, each sidewall is integrally formed with the base and adjacent sidewalls. The maintenance of the pad holder in a sanitary condition is eased by integrally forming the bottom with the sidewalls and integrally forming adjacent sidewalls. The reason is that there will be no crevices and or joints within which waste may accumulate. In addition, the joint between the sidewalls and the bottom may be sloped or curved. This not only adds to the structural integrity of the joint, but also avoids having a corner within which debris may be lodged making the device harder to clean. The sidewalls define an area within which the waste pad may be placed. In one embodiment, sidewall 20 may extend at the same height as the other sidewalls. In another embodiment, sidewall 20 may contain a region with a reduced height that forms an entrance for the animal to gain access to the interior space of the waste pad holder. The reduced height portion may be flush with bottom 12 or may be slightly raised.

The waste pad holder may have waste pad retainer features for retaining the waste pad in place. For example, sidewall 20 may have clamp 32 that may be used to hold one end of the waste pad in place. Clamp 32 may be as simple as a hinged piece that may close and snap into place over one end of the waste pad as shown in FIG. 1. Clamp 32 may also be held in place through spring action. The other end of the waste pad may be held in place by one or more of deformable features 34. Deformable feature 34 is formed from a malleable material such as flexible rubber with opposing interlocking extensions. When a portion of the waste pad is inserted into deformable feature 34, the waste pad is held in place when the opposing extensions return to their original place which traps inserted portion of the waste pad in place. Other methods of holding the waste pad in place may be used, such as clamps, pins, or the like. Alternatively, a holder or clamp may be placed in each corner or on each end. In yet another embodiment, the surface of bottom 12 contains a retention surface that acts to hold the waste pad in position. For example, the surface can contain a Velcro-like surface with, for example, a multitude of projections that act to hold the bottom surface of the pad. In another alternative embodiment, the bottom of the pads may contain a surface that is specially designed to interact with the surface of the pad holder such that the pad is held in place. The retention surface may only be along the periphery of the pad and/or holder, or may be on the entire bottom side of the pad and/or holder. The retention surface on the pad holder may also be replaceable, so that if the retention properties decrease over time the surface may be replaced without replacing the entire pad holder. Preferably, the method of holding the waste pad in place may be easily removable so that a soiled pad may be readily replaced.

Sidewall extensions 22, 24 and 26 are attached to and extend vertically from base 11. The sidewall extensions may be configured to fit within slot 42 formed within the upper surface of sidewalls 14, 16 and 18. The sidewall extensions may be press fit into the slot, or alternatively may be connected to the top of the sidewalls through prongs. In another embodiment, the sidewall extensions may be configured to be flush against the interior surface of, and supported by, sidewalls 14, 16 and 18 and held in place by clips. Clips may contain prongs or screws for attachment to the sidewall extensions and base 12. In one embodiment, a prong extension from a clip may extend through a hole in bottom 12. To lock it into place a second prong extends from the clip in a perpendicular direction to the first prong and extends through a hole in the respective sidewall extension. In another embodiment, the clip may contain a screw hole through which a screw holds the clip against the sidewall extension. In yet another embodiment, a combination of prongs and screws may be used. In yet another embodiment, the sidewalls may be connected to the outside surfaces of the sidewalls.

The sidewall extensions cause an animal entering the device to turn around so as to face outwardly, rather than face a corner. This tends to be a natural reaction for an animal. By turning and facing outward, the animal is more likely to be in the correct position to optimally use the waste pads within the holder. The sidewalls may contain perforations 30 completely through the sidewalls. The perforations allow the animal to see through the sidewall extensions, so that when the animal enters the waste pad holder, it does not feel confined or restricted. The combination of walls through which the animal cannot pass with the walls having perforations so that the animal does not feel trapped when actually entering the space tends to increase the likelihood that the animal will use the waste pad on the holder and increase the likelihood that the animal will assume a position that permits the optimal use of the waste pads.

The sidewall extensions may be connected together through sidewall extension corner pieces 40. Sidewall extension corner pieces 40 provide additional support to adjacent sidewall extensions, making the overall design more robust. Sidewall extension corner pieces 40 may be attached through clips, pressure fit, prongs, screws, sliding engagement or any other known methods of connecting two pieces.

The base and sidewall extensions may be made of any suitable material, but preferably are made from a material that will not absorb odors from animal refuse and is easy to keep clean. In particular, base 12 would consist of a material that is relatively impermeable so that the animal waste will not flow through, soak or be retained in bottom 12. To the extent that bottom 12 has holes through it for, as an example, receiving a screw or prong, the clip and screw or prong will preferable substantially seal the hole.

While the embodiment shown in the figures shows a three piece design, the sidewall extensions may be integrally formed from one piece. The single piece may have flexible joints. For instance, sidewall extension corner pieces 40 may be flexible so that the three sidewall extensions may be folded together.

Figure 5:
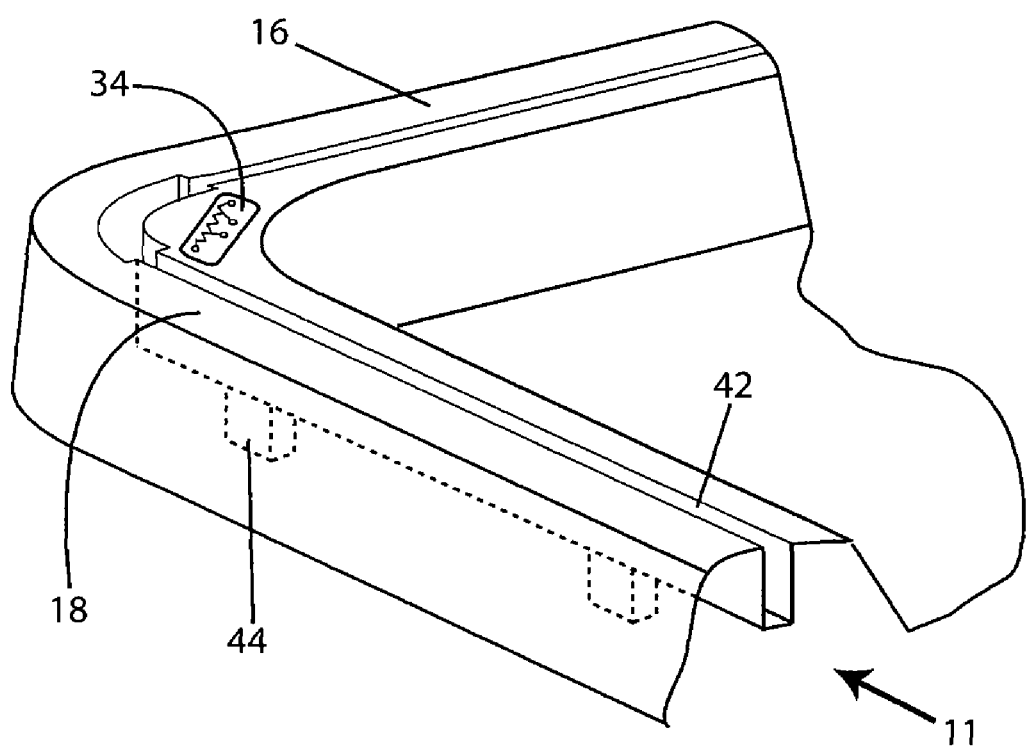
FIG. 5 shows an embodiment of a portion of the base of the waste pad holder of the invention.

A more detailed view of a section of the base is shown in FIG. 5. Sidewalls 14, 16 and 18 may have slot 42 for receiving sidewall extensions 22, 24 and 26. The sidewall extensions may have prongs on the bottom edge that are configured to be inserted into prong receiving holes 44 at the bottom of slot 42. The prongs would hold the sidewall extensions and the walls of the slot would provide additional support to the sidewall extensions. Alternatively, screws can be used from the bottom of base 11 to hold the sidewall extensions in slot 42. In yet another embodiment, the bottom of sidewalls 14, 16 and 18 may slideably engage or be snap fit into slot 42. Any number of methods may be used to securely fasten the sidewalls to the base.

Preferably, the entire waste pad holder can be connected together without the use of tools. Another major consideration in the marketing of pet products is the packaging and shelf space that a product takes up. The volume of space per product in instances has a direct relation to the cost of shipment. Moreover, retail stores take into consideration not only the desirability of a product to consumers, but also a ratio of the shelf space taken up by the product against the potential revenue generated by the product. Thus, the ability to package a given product into a smaller space is a significant advantage. The sidewall extensions and other additional pieces may be placed within the base so that the package is relatively flat. The entire product would take up substantially less shelf space than when the product is put together. The packaged products could also be stacked one on top of another.

Figure 6:
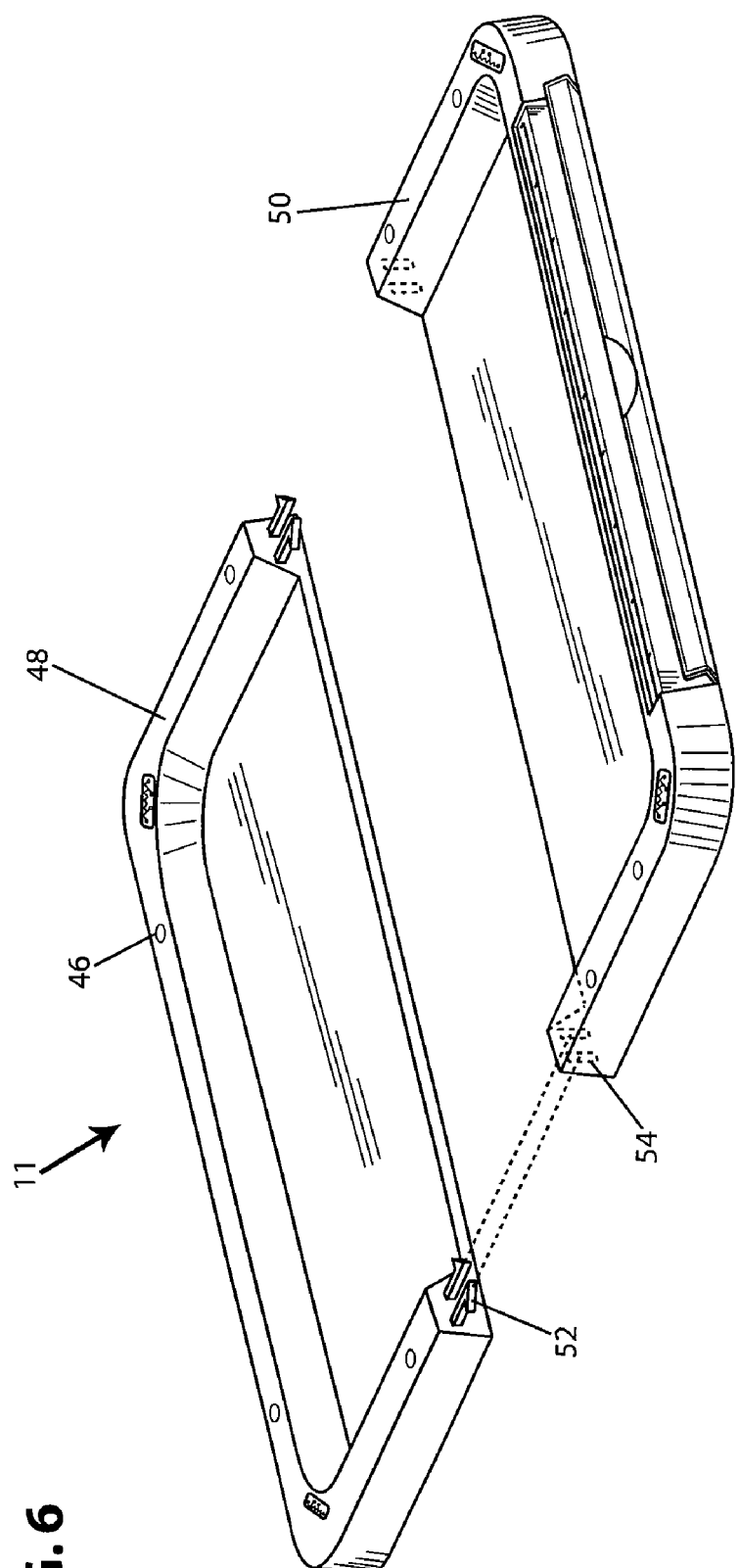
FIG. 6 shows an embodiment of the base of the waste pad holder of the invention.

In one embodiment of the invention as shown in FIG. 6, base 11 may be separated into two sections that may be connected together. In this embodiment, as one example, sidewalls 14, 16, and 18 may have prong receiving holes 46 located along the top of the sidewalls. Base 11 is comprised of sections 48 and 50 that may be connected together to form the complete base. Prongs 52 is section 48 mate with prong receiving holes 54 of section 50. In another embodiment, the sections may be connected through any type of snap-fit, slotted or other type of connection.

Figure 7:
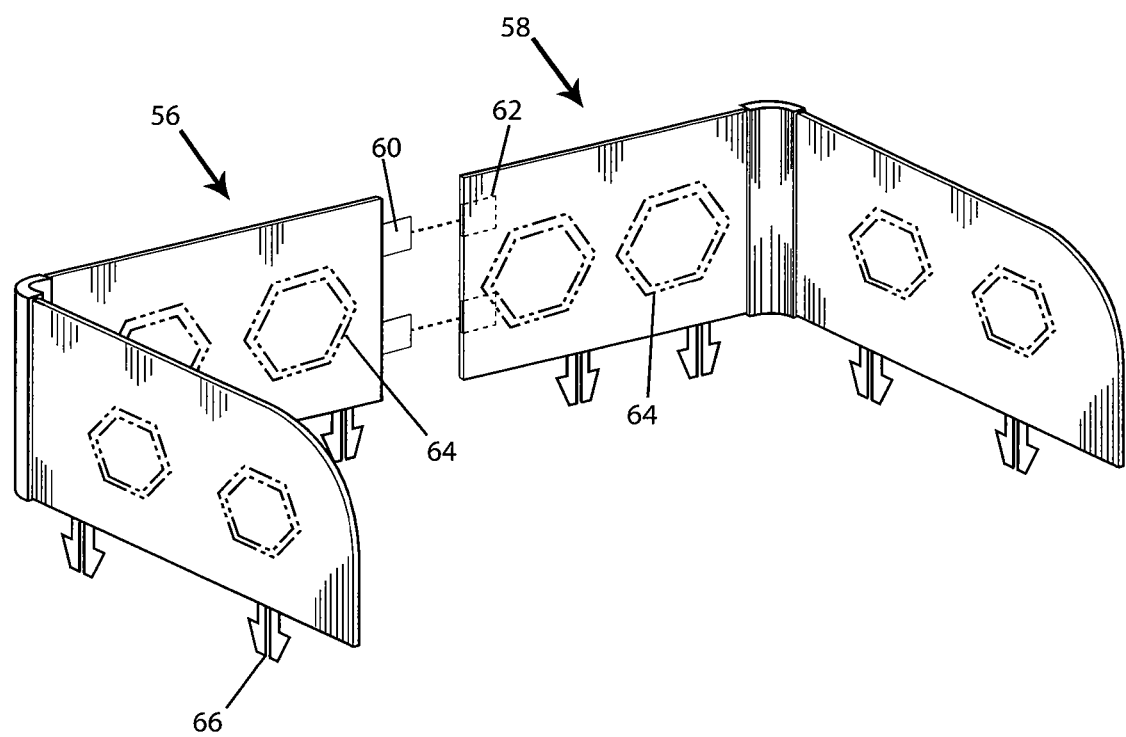
FIG. 7 shows an embodiment of the sidewalls of the waste pad holder of the invention.

Another method of reducing the volume of the product prior to assembly by a user is shown in FIG. 7. Sidewall extensions 22, 24 and 26 may be separated into section 56 and section 58. Each section is comprised of two sidewall extensions connected together through sidewall extension corner piece 40, which in one embodiment may be a flexible piece that permits the sidewalls to be moved into a position parallel and directly adjacent to one another. Section 56 may have prongs 60 extending from the edge of one sidewall extension that mate with a prong receiving slot 62 of section 58. Once connected together, sections 56 and 58 may then be installed onto base 11, through for example connection of prongs 66 to prong receiving holes 46 (for example) of FIG. 6.

In one embodiment, sections 56 and 58 of FIG. 7 may be separately folded and fit into the well section of base 11 formed by the sidewalls. In such an embodiment, the package as provided at retail to customers may be simply the dimensions of base 11 since the sidewall extensions fit substantially or entirely within the well formed by the sidewalls. In another embodiment, one of the sections, for example section 56 may be sized to fit within the well formed by the sidewall extensions for only half of base 11, for example base section 48. Section 58 may be sized to fit within the well formed by the second base section 50. In this embodiment, the package as provided at retail may be dimensioned to be half the length, the same width and twice the height of base 11. In yet another embodiment, base sections 48 and 50 may be configured to fit one into the other so as to minimize the space when packaged together. This may be accomplished by forming the bottom of one section to match the top of another section so that the two sections may be stacked. The base and sidewall extensions may be comprised of several sections, and not just two as shown and described herein.

The bottom of the waste pad holder may contain feet so that the waste pad holder will not slide when placed on a tile or ceramic such as a kitchen or bathroom floor. The underside of the pad holder may also contain ribs that provide structural support to the device but allows less material to be used.

While the invention has been particularly shown and described with reference to preferred embodiments thereof, it will be understood by those skilled in the art that various changes in form and details may be made therein without departing from the spirit and scope of the invention.

What is claimed as new and desired to be protected is:

1. A holder for a disposable waste pad comprising:
   a base;
   three sidewall extensions removably attachable to the base;
   the base having a substantially planar bottom panel for holding the disposable waste pad,
   the base having four sidewalls integrally formed with and located near a periphery of the bottom panel, the four sidewalls being substantially perpendicular to and extending above the bottom panel by a first height;
   the four sidewalls having top surfaces substantially parallel to the bottom panel;
   at least two deformable waste pad retainers formed in the top surface of one or more sidewalls for removably retaining the disposable waste pad substantially between the four sidewalls;
   the sidewalls having the three sidewall extensions extending from the top surface of the sidewalls;
   the three sidewall extensions being perpendicular to the plane of the bottom panel and extending upward from the bottom panel by a second height that is substantially greater than the first height of the base sidewalls;
   each one of the three sidewall extensions being coupled to an adjacent sidewall extension and foldable relative to each adjacent sidewall extension to enable the plurality of sidewall extensions to be folded into one flat configuration;
   each one of the at least three sidewall extensions being rigid with a plurality of perforations extending completely through the three sidewall extensions and spaced along a length of each sidewall extension.

2. The holder of claim 1 wherein the waste pad retainer includes a clamp on a sidewall not having a sidewall extension extending from the top surface for holding a first end of the disposable waste pad, the clamp extending for substantially the entire length of the one sidewall.

3. The holder of claim 2 further comprising a means for retaining the waste pad located on a top surface of the planar bottom panel.

4. The holder of claim 1 wherein the base is formed from two separably connected base sections.

5. The holder of claim 4 wherein each of the sidewall extensions has a length and a width less than a second length and a second width respectively, of one of the base sections.

6. The holder of claim 1 wherein adjacent sidewall extensions are connected by a removable corner piece.

7. The holder of claim 1 wherein adjacent sidewall extensions are connected by a flexible joint.

8. The holder of claim 1 wherein one of the sidewall extensions is comprised of two separable pieces.

9. A holder for a disposable waste pad comprising:
   a base having a substantially planar bottom panel for holding the disposable waste pad;
   the base having four sidewalls integrally formed with the bottom panel, the four sidewalls being substantially perpendicular to and extending above the bottom panel by a first height that is substantially less than a width or length of the bottom panel;
   the four sidewalls having top surfaces substantially parallel to the bottom panel and an interior face substantially perpendicular to the planar bottom panel;
   the top surface or interior face of one or more of the four sidewalls including at least two waste pad retainers for removably retaining the disposable waste pad substantially between the four sidewalls;
   the at least two waste pad retainers located either substantially on each end of one of the four sidewalls or on two different sidewalls;
   a plurality of sidewall extensions removably attachable to the sidewalls without interfering with operation of the at least two waste pad retainers, the sidewall extensions being substantially perpendicular to the plane of the bottom panel and the sidewall extensions extending upward from the bottom panel by a second height that is substantially greater than the first height of the base sidewalls;
   each one of the sidewall extensions being coupled to an adjacent sidewall extension and foldable relative to each adjacent sidewall extension to enable the plurality of sidewall extensions to be folded into a flat configuration;
   each one of the sidewall extensions being rigid with a plurality of perforations extending completely through the sidewall extensions and spaced across the length of each sidewall extension.

* * * * *